United States Patent [19]
Whitley

[11] 3,743,190
[45] July 3, 1973

[54] HARD MEDIA BENEFICIATION PROCESS FOR WET CLAY

[75] Inventor: James Brooks Whitley, Macon, Ga.

[73] Assignee: J. M. Huber Corporation, Locust, N.J.

[22] Filed: Oct. 22, 1971

[21] Appl. No.: 191,654

Related U.S. Application Data

[63] Continuation-in-part of Ser. No. 885,168, Dec. 15, 1969, Pat. No. 3,667,689.

[52] U.S. Cl. .................................................. 241/4
[51] Int. Cl. ............................................. B02c 13/00
[58] Field of Search ...................... 241/4, 15, 26, 27

[56] References Cited
UNITED STATES PATENTS

| | | | |
|---|---|---|---|
| 3,464,634 | 9/1969 | Brociner | 241/4 |
| 3,446,442 | 5/1969 | Carter | 241/15 |
| 3,185,398 | 5/1965 | Hughes et al. | 241/21 X |
| 3,034,859 | 5/1962 | Gunn et al. | 241/4 X |
| 3,309,030 | 3/1967 | Molls et al. | 241/21 |
| 3,337,140 | 8/1967 | Wahl | 241/21 |

*Primary Examiner*—Granville Y. Custer, Jr.
*Attorney*—Harold H. Flanders

[57] ABSTRACT

A method of producing clays of a selectively reduced particle size and increased brightness, uses a hard, relatively dense grinding medium on the wet minerals.

7 Claims, 5 Drawing Figures

HARD MEDIA BENEFICIATION PROCESS FOR WET CLAY

CROSS REFERENCES TO RELATED APPLICATIONS

This application is a continuation-in-part of an application, Ser. No. 885,168, filed Dec. 15, 1969, entitled "Method for Producing Mineral Products", now U.S. Pat. No. 3,667,689, which issued June 6th, 1972.

BACKGROUND OF THE INVENTION

This invention relates to comminuted mineral products and more particularly to an improved process for the production of small particle size clays having unique ability for coating paper.

As known in the art, clays used for coating paper are identified by the percentage, by weight, of the particles above and below 2 microns equivalent spherical diameter (ESD). For example, the more expensive coating clays may have more than 90 percent by weight of their particles below 2 microns. Clays are further graded according to their brightness as determined in accordance with TAPPI tentative standard T646 M-54.

For many years, the conventional method of producing high grade kaolin clay as required in the coating of paper has been to deflocculate the crude material in an aqueous suspension and classify the crude, as by sedimentation, into fine and coarse fractions. While the coarse fraction removed from crude may sometimes be sold as filler clay, the market for this material is limited and filler grade clay is of a value well below coating grade clays. In more recent years, it has been found that socalled delaminated clays produced from coarse or filler grade clays are in many cases superior to coating clays made by the conventional classification of the natural crude. In this regard, delaminated clays, by virtue of the great breadth and thinness of the particles, give a smoother coated surface with improved printability. Further, enhancement in brightness is achieved from delamination for the reason that fresh unstained surfaces are exposed by exfoliation of the kaolin stacks into thin units. In general, and again as known in the art, crude clay deposits, such as Georgia kaolin, contain particles ranging in size from smaller than 0.1 micron to at least 15 microns. Particles smaller than about 1 – 3 microns in diameter are mostly plate-like in shape with the diameter averaging 6 – 10 times the thickness. Particles larger than about 1 – 3 microns are substantially all multi-crystalline stacks or booklets composed of varying numbers of single crystals, cemented together in a face-to-face fashion. Coarse clays, as the term is utilized in the present description, include those clays composed substantially of stacks as well as clays composed of mixtures of stacks and fine crystals of kaolin. Delaminated clays are produced from these thick laminated masses by splitting the stacks into thin plate-like units.

There are presently a number of known and available methods for producing delaminated coating clays. Thus, in U. S. Pat. No. 3,171,718, there is disclosed a process wherein delamination is accomplished by agitating an aqueous slurry with a fine, non-abrasive resilient grinding media such as nylon beads or pellets. In this regard, the concept of using an abrasive grinding medium, such as sand, is also known. An example of this technique is disclosed in U. S. Pat. No. 3,075,710 which involves the wet-grinding of a coarse clay utilizing a grinding medium harder than the material to be ground, such as sand. This technique, however, results in excessive discoloring of the clay due to the abrasiveness of sharp particles on the machinery and breakage of sand granules due to fissures running thru them. In a further known process, delamination is effected by the kneading action of a pugmill without the use of grinding media, an example of this process being disclosed in U. S. Pat. No. 3,058,671. Extrusion and kneading have also been employed.

Though many such above discussed methods have been adopted and have achieved commercial acceptance, none has proved entirely satisfactory. Thus, processes wherein delamination is effected with a pugmill suffer from the disadvantage in that only coarse fractions can be treated and of these only about one-half of the coarse particles are delaminated, even when powerful pugmill equipment is employed. In such processes the oversize material has to be separated from the delaminated material by a separate classification step. Recycling of the over-size material to the pugmill has proved to be economically impracticable.

Pugmills as well as other mechanical devices which apply large amounts of physical work to the coarse clay result in not only delaminating part of the stacks or booklets but also, due to the high energy level of work input at the isolated contact areas between the clay and the mill, result in a shearing of some of the individual platelets transversely. Thus, individual crystals or platelets are themselves broken up and the coating ability of the clay may be degraded rather than improved.

The alternative to the mechanical devices such as pugmills, ballmills, extrusion, etc. is to use abrasive grinding media. In general, attempts to utilize high intensity-grinding equipment employing abrasive grinding media have not been successful due to the fact that the brightness of the product is degraded. Presently, no known coating clays are being commercially produced by this process. While so-called "low intensity" grinding techniques employing non-abrasive or plastic grinding media produce a high quality delaminated clay product, such processes suffer from the inherent disadvantage of slow grinding rates, resulting in the increased cost of production, relatively low yield rates and inability to obtain maximum available brightness. Further, somewhat more complex production procedures are required in such grinding methods of limited intensity because of the need for recycling to obtain complete exfoliation.

SUMMARY OF THE INVENTION

In summary, the present invention provides a highly efficient process for producing comminuted minerals, particularly high grade coating clays employing a hard, abrasive grinding medium. In contrast to prior known processes, the present invention provides a method wherein the advantages of hard abrasive grinding medium, i. e. high grinding rates and high yields are obtained with minimum discoloration of the clay due to less abrasion of the equipment. In its broadest aspect, the method of the present invention comprises the selective reduction of the booklet structure of coarse clays to the platelet structure of fine coating clays with a hard microspheroidal grinding media.

It is accordingly a general object of this invention to provide a unique process for producing comminuted minerals, particularly high brightness coating clay, said process not subject to the disadvantages of prior known processes, yet exhibiting the high efficiency of hard media high intensity grinding.

Another and more particular object of this invention is to provide a highly efficient and economical process for producing high quality coating clays employing high intensity grinding.

Yet another object is to provide a process for grinding relatively coarse kaolinitic clay to extremely fine size employing a hard abrasive grinding medium and fast grinding rates with minimum discoloration of the resulting clay product from a abrasion of the metal apparatus, or transverse shearing of the platelike structure of the clay.

BRIEF DESCRIPTION OF THE DRAWINGS.

The manner in which the foregoing and other objects are achieved in accordance with the present invention will be better understood in view of the following detailed description and accompanying drawing which forms a part of this specification, and wherein.

DESCRIPTION OF THE PREFERRED EMBODIMENTS

The use of mechanical working means such as pugmills and ballmills on lamellar clays results in a partial delamination of the booklet crystalline structure and a transverse breaking of a portion of the individual platelike particles. This transverse breakage is believed to be due to the high level of energy and work which must be applied to the clay through the relatively limited amount of contact surface area available. This is especially true of physical milling means such as pugmills. In such a mill, a large amount of work is done on the clay but on a microscopic level, the distribution of work energy to the particles is extremely uneven, with some booklet particles and platelets receiving an excessive amount of work, some booklets receiving a moderate amount of work, and some booklets receiving substantially no work. As a result, some booklets and platelets suffer transverse breakages, some booklets are successfully delaminated, and many booklets remain substantially unchanged and unimproved.

Since the work input achieved by such physical milling means is applied on a macroscopic and random basis, it has been desirable to apply minute amounts of work to the clay particles at every point in the clay slurry on a microscopic scale. If small units of work can be spread out over the whole matrix being worked and the units of work can be limited to values below the force required for transverse shearing yet above the values for delamination, then this would be the ideal situation. The present invention achieves this result as nearly as is believed physically possible by efficiently and quickly applying small, numerous, equally distributed impacts to the clay particles suspended in an aqueous slurry. The number, frequency, and magnitude of these impacts can also be controlled to a high degree.

This control is accomplished by suspending a large number of hard microspheroidal particles in the clay slurry and applying a slow, steady stirring to the slurry. Any type of agitating means may be applied as long as it results in a movement of the slurry. The agitation results in minute impacts and shearing forces arising between the microspheroids and the clay booklets. The agitation rate can be controlled as can the size and concentration of microspheroids in order to limit the impact and shearing forces applied to the clay particles.

The practical limits of the impact work on each particle, although they cannot be measured directly, can be measured empirically by measuring the rheological and coating properties of various clay slurries which were worked under varying conditions.

Thus, it is not necessary to know the maximum work a platelet can withstand without transverse shearing, nor the minimum amount of work which will separate the platelets of a booklet particle.

Instead, the rate and total amount of agitation, amount of microspheroidal media, and size of the microspheroids which produce the most desirable clay product for coating or for pigment uses can be determined experimentally in a slurry-by-slurry batch experiment.

A grinding media found to be particularly suitable was microspheroids of an aluminum magnesium alloy. This alloy gives a microspheroid of favorable density (specific gravity between 2 and 3) sufficient hardness, and non-abrasiveness to the vessels and machinery. A second media also found to be particularly adapted for this type of work was glass microspheroids. The cost of the aluminum-magnesium alloy makes it less desirable than glass on a mass volume basis.

The most favorable and economical grinding media consists of microspheroids of a glass having a specific gravity of around 2.45. These microspheroids exhibited a high crush strength and low abrasion effect on the vessels and machinery.

These glass microspheroids have been found to provide a faster grinding rate than materials such as sand and plastic due to their hardness and spherical nature. As compared to sand, they have a lower specific gravity, are easier to suspend, and, thus, require less power in mixing. Glass microspheroids have a higher crush strength and therefore provide less contamination than sand. They are more homogeneous in structure and, in general, have less fractures or fissures to weaken them and cause breakage. Also, a variety of glass microspheroids are commercially available with a more uniform spherical shape and greater hardness than sand which results in a faster grinding and better contact of the media. In addition to the before-mentioned variables, such as the media/slurry ratio, agitation speed, etc., various effects may be obtained by balancing size versus the number or frequency of impingements. Thus, glass microspheroids permit somewhat tailored results by allowing various sized distributions of the microspheroids to be used. One can achieve optimum effects by proper selection of their size. An increase in the size of media yields larger grinding intensity and forces but fewer impingements. Further, the microspheroids provide for better intermittent operation because they are easier to resuspend on start-up because of their relative lightness. In summary, they provide high strength and wear resistance, and are inert and non-contaminating. As set forth above, the specific gravity of the media should be greater than that of the clay-water suspension. A clay-water slurry containing 30 percent clay has a specific gravity of approximately 1.23, whereas the preferred media generally has a specific gravity of about 2.45.

A media suitable for use in the present invention is that identified as Class IV, Type 203 Uni-Spheres, manufactured by the Microbeads Division of Cataphote Corporation, which consists of microspheroids having a specific gravity of about 2.45 and a diameter in the range of about 20 mesh to 30 mesh (Tyler standard screen scale). It has been discovered that the use of glass media, as heretofore described, permits substantially complete reduction to the required fineness in one pass, in contrast to known processes wherein a portion of the ground material must be recycled to the grinding apparatus or discarded. While other media, such as Ottawa sand and small fused alumina spheres, may be employed, such media having a greater specific gravity are more difficult to suspend, require more power in mixing and do not otherwise offer the unique advantages of the glass microspheroids.

The process of selective exfoliation can be carried out as a batch operation or as a continuous process. Preferably, it is carried out in a continuous manner with the suspension of clay in water circulating through an agitated suspension of grinding media with the clay suspension flowing from the grinding tank through a screen which restrains the media. In either batchwise or continuous operation, agitation of the hard, abrasive media in the clay suspension is sufficient to provide the percussive and frictional milling action required to produce exfoliation. The process is continued until the coarse clay stacks or booklets are delaminated and converted into platelets of the desired or specified particle size. In general, any conventional tank or vessel equipped with agitating means, etc., may be employed in practicing the exfoliation step of the present invention. Suitable apparatus are disclosed in U. S. Pat. Nos. 3,075,710 and 3,171,718. Preferably, the vessel and agitator are covered with rubber or other suitable elastomer to avoid corrosion and wear of the metal parts.

Figure 1:
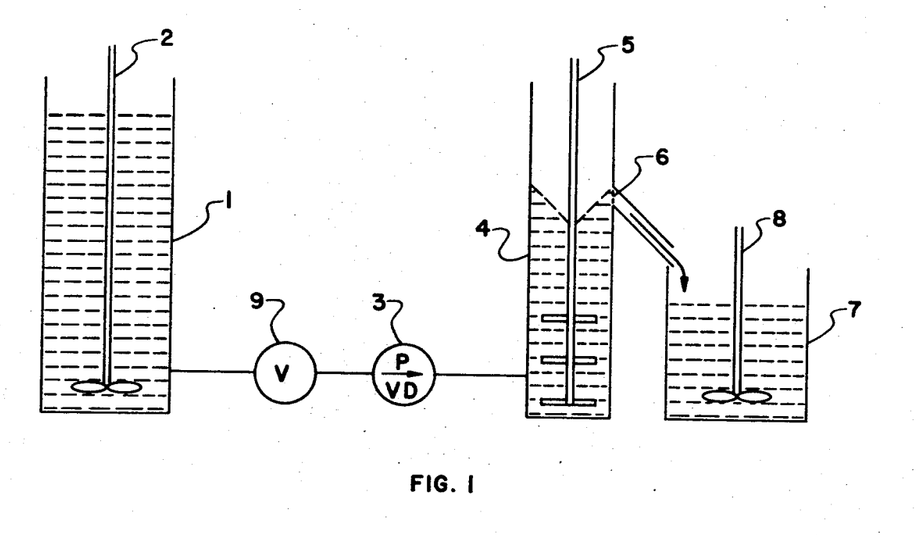
FIG. 1 is a diagrammatic illustration, shown in elevation, of a suitable arrangement of apparatus for carrying out a particularly advantageous embodiment of the invention.

The invention will be further illustrated by the following specific working examples which set forth particularly advantageous method embodiments employed in the exfoliation of coarse clays in accordance with the present invention. Unless otherwise indicated, the apparatus employed in the exfoliation step is substantially that as illustrated in FIG. 1. The slurry agiation was effected in a vessel indicated generally at 4, said vessel being provided with a cross-arm impeller 5. In the case of batchwise agitation, the dispersed clay slurry and grinding medium were placed directly into the vessel 4 and agitated for a period sufficient to effect the degree of exfoliation desired. Separation of the ground slurry from the media was effected by screening. In the case of continuous operation, the starting procedure was the same as that in the batchwise procedure. In this case, however, after reducing the initial charge of slurry in the vessel 4 to the desired fineness, the flow of feed slurry from the feed tank 1 which is kept in homogenous suspension by agitator-impeller 2, was initated by opening valve 9. The rate of feed flow into the vessel 4 was thereafter controlled by a variable speed pump 3 to provide the necessary retention time in the vessel 4. The exfoliated clay slurry overflowed the mixing tank through an 80 mesh screen 6 which served to retain the grinding media in the vessel. The clay slurry was then collected in tank 7 where it is maintained in a homogenous suspension by agitator 8. In the following examples, a Plexiglass grinding vessel (4) provided with a polyurethane covered impeller (5) was used to prevent contamination and discoloration of the product from the action of the grinding media and aqueous elements on the metal surfaces of the equipment.

EXAMPLE 1

In this example, the effect of different variables on the rate of exfoliation was determined using the batch grinding procedure. The standard cross-arm impeller and 20–30 mesh glass microspheroids were used except as otherwise noted. After grinding, the slurry was separated from the media by screening. The increase in particle fineness of the clay was used as a measure of the rate of exfoliation.

The starting material was filler grade clay in dispersed slurry form. The clay had the following particle size.

| | |
|---|---|
| Coarser than 10 microns | 16.8% |
| Coarser than 5 microns | 38.5% |
| Finer than 2 microns | 35.2% |

A. EFFECT OF MEDIA/SLURRY RATIO

Figure 2:
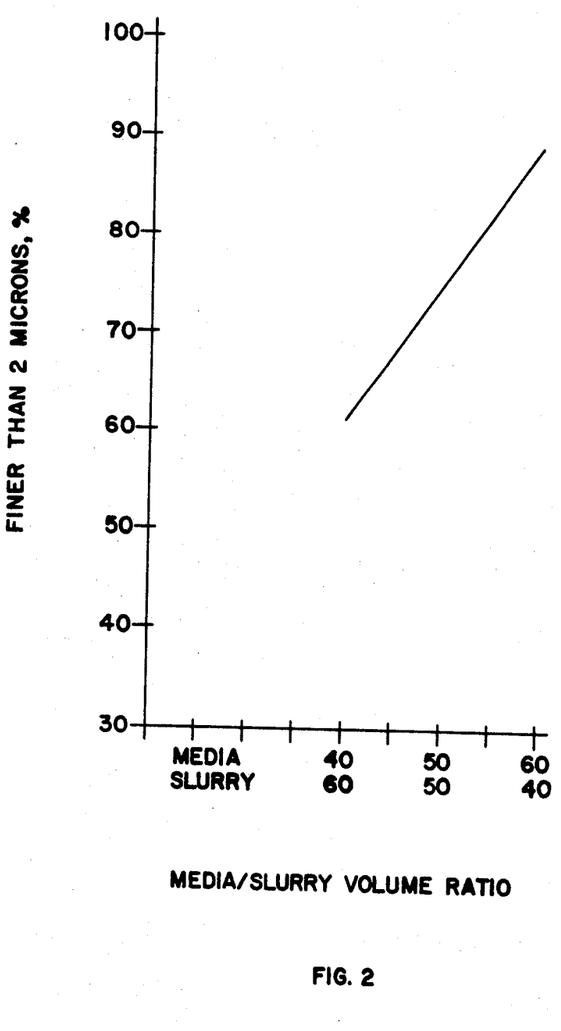
FIG. 2 is a graph showing the effect of the grinding media-slurry ratio.

The media/slurry ratio was varied from 40:60 to 60:40, calculated on a true volume basis. Other conditions in the tests were the same, including total volume of mixture in the mixing tank, impeller speed, mixing time (retention) and concentration of the clay slurry. FIG. 2 shows the effect of media/slurry ratio for a 30 percent solids slurry with a mixing time of 30 minutes and impeller speed of 1,300 f.p.m.. As shown in FIG. 2, the rate of grinding was increased as the volume of media to volume of slurry was increased. However, a 55:45 media/slurry ratio is about the highest practical volume of media with which good flow was obtained in the tank.

B. EFFECT OF IMPELLER SPEED

Figure 3:
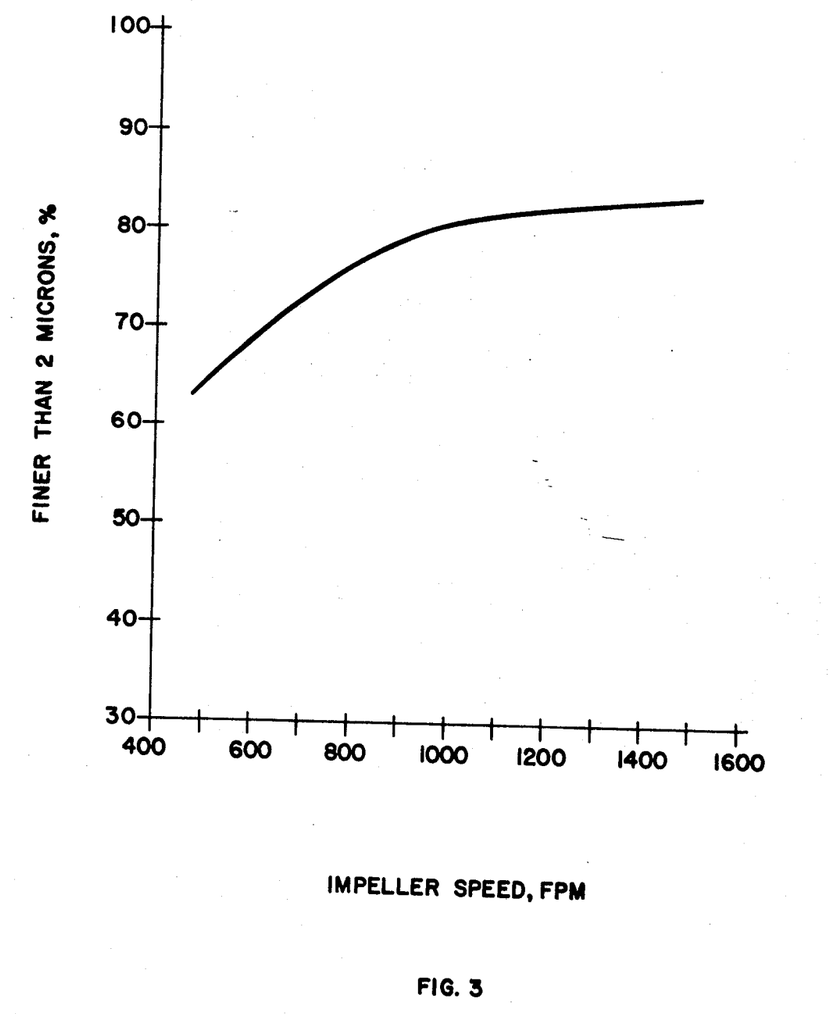
FIG. 3 is a graph showing the effect of the impeller speed in the selective decrystallization of the coarse clay-water slurry.

The effect of impeller speed on the grinding rate is illustrated in FIG. 3, for a media/slurry ratio of 55:45, a 30 percent solids concentration slurry, and a retention time of 30 minutes. The grinding rate increased as the impeller speed was increased up to about 1,000 f.p.m. and then leveled off. However, effectiveness of impeller speed varies with such factors as type of impeller, dimensions of impeller and tank, etc.

C. EFFECT OF GRINDING TIME

Figure 4:
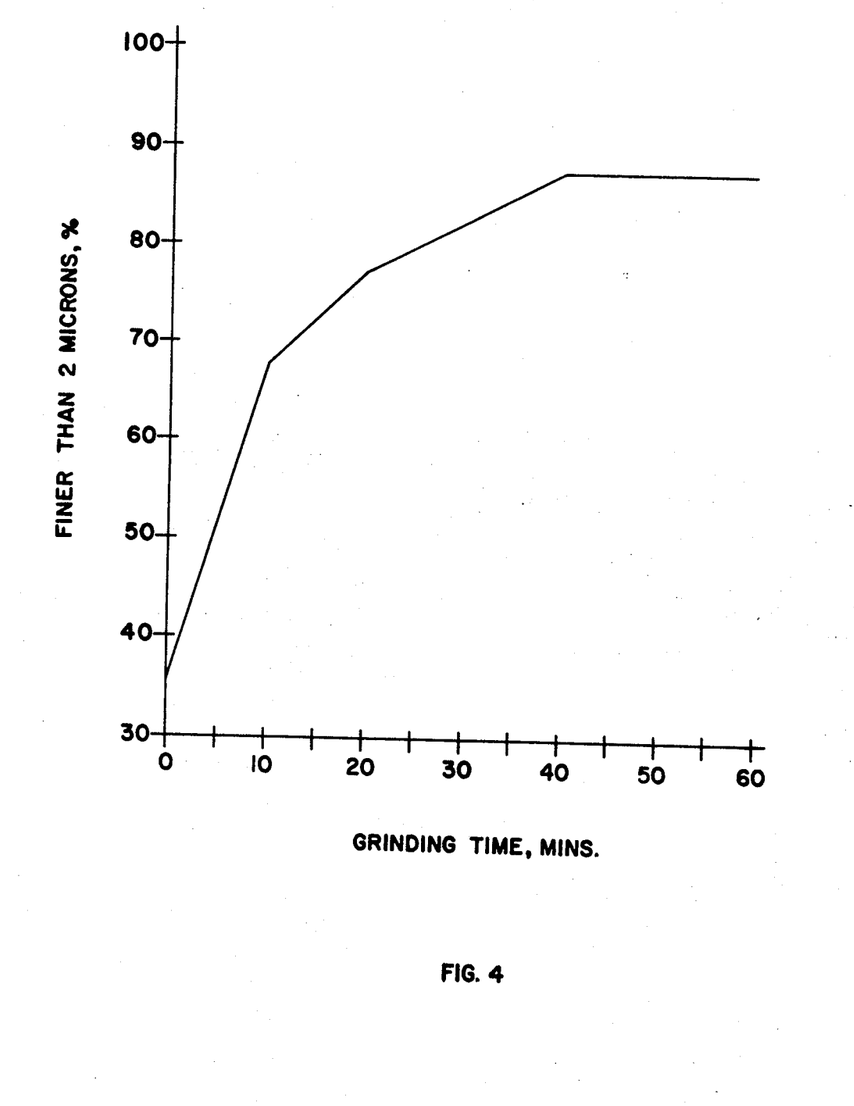
FIG. 4 is a graph showing the effect of grinding time in the process.

The increase in particle fineness with grinding time is shown in FIG. 4 for the 30 percent solids slurry having a media/slurry ratio of 55:45 and subjected to an impeller speed of 1,300 f.p.m.. Reduction in particle size is accomplished at a decreasing rate as the mixing time is extended and the clay becomes progressively finer. A particle size of 75 percent minus 2 microns was obtained after mixing for 18 minutes. Further increase in fineness was obtained up to about 40 minutes mixing, after which there was very little significant further particle reduction and such as did occur proceeded very slowly.

D. EFFECT OF SLURRY SOLIDS

Figure 5:
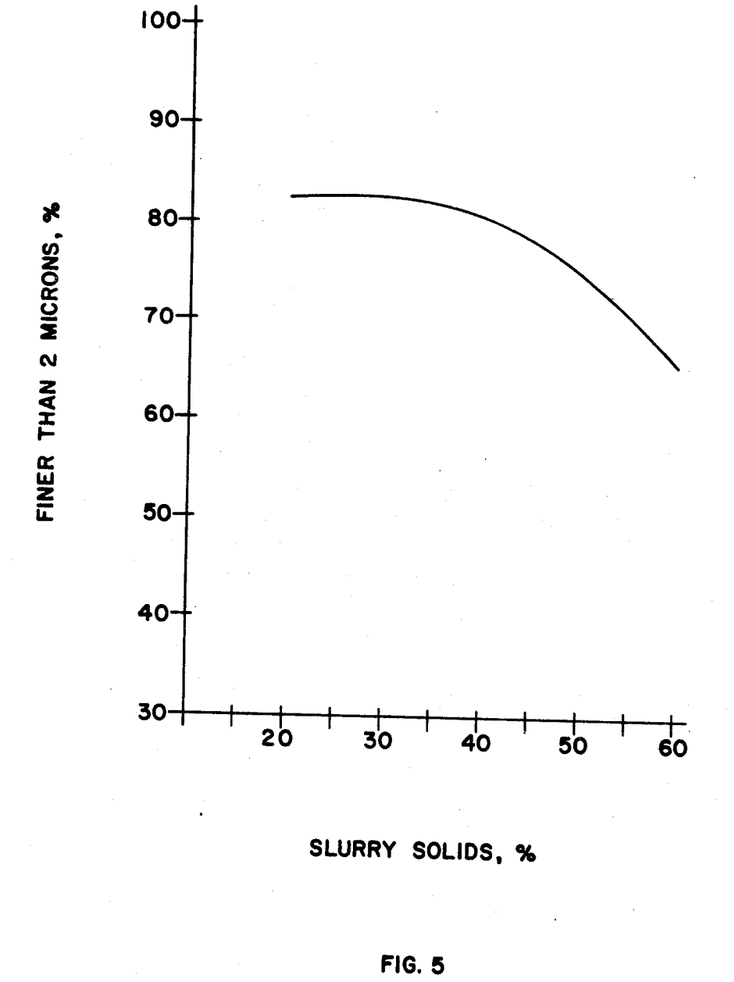
FIG. 5 is a graph showing the effect of the percent of the slurry solids (clay) in the process.

In general, faster grinding was obtained when the dispersed slurry contained less than about 40 percent by weight of clay as shown in FIG. 5 which illustrates the effect of slurry solids on a slurry having a media/slurry ratio of 55:45 with 30 minutes retention and an impeller speed of 1,300 f.p.m.. At higher slurry solids, the grinding rate drops off which offsets to some extent, the increased production resulting from the greater amount of clay in the grinding chamber.

E. EFFECT OF MEDIA SIZE

Tests were made with three sizes of microspheroids. All were of the same Class IV Type 203 Uni-Spheres supplied by the Cataphote Corporation. Batch size and other conditions of the tests were the same.

| | |
|---|---|
| Media/slurry ratio | 55:45 |
| Impeller speed | 1300 f.p.m. |
| Mixing | 30 minutes |
| Clay-water concentration | 30% clay |

Table I shows particle reduction obtained by delaminating with the three media sizes.

TABLE I

| Media Size | | Clay Size |
|---|---|---|
| Mesh | Micron-Range | Finer than 2 Microns, % |
| 8-12 | 2380-1680 | 71.2 |
| 20-30 | 840- 590 | 82.0 |
| 40-50 | 420- 297 | 75.8 |

As shown in Table I, faster grinding was obtained with the 20–30 mesh microspheroids than with either the larger or smaller sizes. It appears that the 20–30 mesh size gives about the right compromise between impact intensity, which is greater with the larger and heavier media and frequency of impact, which is greater with the more numerous smaller-sized media.

F. EFFECT OF TYPE OF IMPELLER

The rate of grinding obtained with a turbine impeller was compared with that obtained with the standard cross-arm impeller used in all the above tests. The turbine impeller was 3 inches in diameter and had six ½ inches wide blades. Testing conditions were otherwise the same as in E of Example 1. Rate of exfoliation as measured by increase in fineness, is shown in Table II.

TABLE II

| Impeller Type | Diameter | Finer than 2 microns, % |
|---|---|---|
| Cross-arm | 3 ½" | 82.0 |
| Turbine | 3 | 83.0 |

The two impellers produced about the same amount of particle reduction indicating that the impeller shape is not a critical factor in exfoliating coarse fractions, provided the impeller is designed to give sufficient flow to keep the entire mixture in suspension.

EXAMPLE 2

In this example, one-pass exfoliation of clays was carried out and then the same apparatus was used for a recycle process where remaining coarse clays were classified and returned to the grinding tank. The starting material was unleached filler slurry from regular plant production with a brightness of 79.4 and a particle size as follows:

| | |
|---|---|
| Coarser than 10 microns | 15.8% |
| Coarser than 5 microns | 36.2% |
| Finer than 2 microns | 35.9% |

Slurries were subjected to the continuous one-pass procedure and reduced to a particle size of 72 percent by weight finer than 2 microns using 27.5 minutes retention time in the grinding tank.

In other slurries, oversized particles were continuously separated from the exfoliated slurry and recycled to the grinding tnak for further reduction in size.

The starting feed material to the grinding tank in the second sample was the same filler slurry used in the first sample. The apparatus and procedure were the same except that the overflow slurry from the grinding tank was continuously classified by centrifugation to separate the coarser 20 percent of the clay and this coarse fraction was returned to the feed slurry for re-grinding. It was found that the finer 80 percent of the clay obtained in classifying the overflow slurry from the grinding tank had a particle size of 72 percent by weight finer than 2 microns when the retention time in the grinding tank was adjusted to 14 minutes. Brightness of the second sample was the same as that obtained by the one-pass procedure of the first sample, 81.3. This test showed that an increase in the grinding rate is obtained with the classification and recycling but the advantage of this procedure as compared with the substantially complete exfoliation in one-pass procedure is offset in part or entirely by the expense and control involved in the extra classification step.

EXAMPLE 3

In this experiment, exfoliated clays were prepared from the whole crude clay with retention times in the grinding tank being varied.

The crude clay was slurried in water with three pounds Calgon per ton of clay and degritted by settling. The degritted clay had the following particle size:

| | |
|---|---|
| Coarser than 10 microns | 4.2% |
| Coarser than 5 microns | 13.0% |
| Finer than 2 microns | 66.6% |

One crude clay sample was reduced to a particle size of 82.2 percent finer than 2 microns by the continuous one-pass precedure using 10 minutes retention time in the grinding tank.

TABLE III

| | Brightness | Particle Size, Finer than 2 Microns E.S.D. |
|---|---|---|
| Degritted crude | 82.8 | 66.6% |
| After 10 minutes retention time | 83.7 | 82.2% |
| After 52 minutes retention time | 84.4 | 92.0% |

This experiment shows that the whole crude clay can be reduced to the fineness of a No. 1 conventional coating grade in one pass through the high intensity grinding apparatus and that brightness of the resulting product is very significantly enhanced by the treatment.

As should be readily apparent in view of the foregoing examples, the present invention provides a unique, highly efficient process for preparing high quality coating clays. While the aforementioned examples set forth specific embodiments and process conditions for practicing the invention, it should be expressly understood that the invention is not limited thereto. Further, since many different embodiments of the invention, such as variations in the type of equipment employed, will be readily apparent to those skilled in the art, the invention is not limited to such details disclosed for illustrative purposes. Further the method of the present invention is applicable to materials other than kaolinite such as pyrophyllite, mica, natural and synthetic silica pigments, etc., where fast and economical grinding to a fine particle size without degradation in brightness and whiteness is required.

It should be borne in mind that in many processes, including clay processing, even minor improvements in the properties of the feed material may result in significant improvements in the end product.

While the present invention finds particular use in the processing of and production of exfoliated clays, the present invention is not limited to such applications but rather may be employed in any process which necessarily or desirably involves particle size reduction, defoliation, exfoliation, comminution, or the breaking down of micaceous, lamellar, tabular or plumbose structures by fracturing, grinding, kneading, extrusion or the like.

Although specific preferred embodiments of the present invention have been described in the detailed description above, the present description and drawings are not intended to limit the invention to the particular forms and embodiments disclosed herein, since they are to be recognized as illustrative rather than restrictive and it will be obvious to those skilled in the art that the invention is not so limited.

For example, the process of the present invention may be supplemented by combining with it other conventional whitening procedures such as leaching, magnetic separation, froth flotation, dry milling, calcination, etc. It is also clear that the disclosed apparatus could obviously be modified by the use of plural impeller shafts with any number of blades and separation of the glass microspheroids can be achieved by other processes than screening such as using various sized compartments to drop out the glass microspheroids from the slurry.

It is also known that application of ultrasonic energy such as ultrasonic sound waves, to a lamellar mineral structure results in a delamination of the mineral aggregates and that a method of strictly controlling such an exfoliation process would involve finding a threshold level of ultrasonic energy input that would exfoliate the particular mineral involved without causing any transverse breakage of the crystallite. It is clear that ultrasonic delamination could be used in combination with the processes of the present invention.

The invention is declared to cover all changes and modifications of the specific examples of the invention herein disclosed for purposes of illustration, which do not constitute departures from the spirit and scope of the invention and defined by the following claims and their reasonable and obvious equivalents.

I claim:

1. A method for selectively cleaving the crystalline planes and increasing the brightness of kaolinitic clays suspended in an aqueous slurry, said method comprising the steps of preparing a kaolin clay-water slurry having from about 10 to 60 percent, by weight, of suspended clay solids; subjecting said clay-water slurry to agitation in the presence of a microspheroidal grinding medium, said grinding medium being harder than the clay solids to be ground and having a specific gravity greater than said clay-water slurry; continuing said agitation of said slurry and grinding medium to produce a substantial increase in the amount of said clay having a particle size less than 2 microns and recovering the ground clay fraction of reduced particle size from said slurry, said clay so recovered having a G. E. brightness of at least 80.

2. The method of claim 1 wherein the ratio of said microspheroids to clay solids in said agitated slurry is from about 40:60 to 60:40 and said slurry contains less than about 40 percent by weight of clay solids and wherein the coarse clay fraction subjected to said agitation in the presence of said harder grinding medium undergoes a preferential particle size reduction by exfoliation of the laminated multi-crystalline kaolin stacks into thin platelike units to provide a substantially exfoliated clay.

3. The method of claim 1 wherein said grinding medium is glass microspheroids.

4. The method of claim 3 wherein said microspheroids are substantially uniform and spherical and have diameters in the range of from about 20 to 30 mesh on the Tyler standard screen scale.

5. The method of claim 1, said method further comprising passing said slurry to a feed tank, establishing a predetermined kaolin solids content and particle size within said feed tank, pumping said slurry from said feed tank through a variable speed pump to a comminution vessel at a controlled flow rate to maintain the predetermined contitions within said vessel and maintaing a predetermined retention time within said vessel.

6. The method of claim 5 wherein said slurry is pumped from said feed tank to said comminution vessel to establish a predetermined grinding media to slurry volume content.

7. The method of claim 5 further including agitating said slurry including said microspheroids by at least one impeller, said impellers being polyurethane covered, and overflowing said exfoliated slurry from said vessel through a retaining screen into a storage vessel.

* * * * *